(12) United States Patent
Armstrong et al.

(10) Patent No.: US 7,746,985 B2
(45) Date of Patent: Jun. 29, 2010

(54) METHOD, SYSTEM AND DEVICE FOR RELAY CALL TRANSFER SERVICE

(75) Inventors: Edward Franz Armstrong, American Fork, UT (US); Theresa R. Armstrong, legal representative, American Fork, UT (US); Michael Drew Flathers, Alpine, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 1037 days.

(21) Appl. No.: 11/225,956

(22) Filed: Sep. 14, 2005

(65) Prior Publication Data

US 2007/0064894 A1 Mar. 22, 2007

(51) Int. Cl.
H04M 11/00 (2006.01)
H04M 15/06 (2006.01)

(52) U.S. Cl. .................... 379/52; 379/93.15; 379/93.09

(58) Field of Classification Search .................... 379/52, 379/93.15, 93.05, 93.06, 93.09; 370/352
See application file for complete search history.

(56) References Cited

U.S. PATENT DOCUMENTS

| | | | |
|---|---|---|---|
| 4,878,843 A | 11/1989 | Kuch | |
| 5,559,855 A | 9/1996 | Dowens et al. | |
| 5,890,120 A | 3/1999 | Haskell et al. | |
| 5,936,679 A | 8/1999 | Kasahara et al. | |
| 5,982,853 A | 11/1999 | Liebermann | |
| 5,990,878 A | 11/1999 | Ikeda et al. | |
| D421,225 S | 2/2000 | Kelley | |
| 6,116,907 A | 9/2000 | Baker et al. | |
| 6,204,974 B1 | 3/2001 | Spitzer | |
| 6,317,716 B1 | 11/2001 | Braida et al. | |

(Continued)

FOREIGN PATENT DOCUMENTS

EP 1 764 989 A1 3/2007

(Continued)

OTHER PUBLICATIONS

Effective set-up for performing phone conversations by the hearing impaired, IBM Technical Disclosure Bulletin, IBM Corp. New York, US, Dec. 1, 1991, pp. 423-426, vol. 34, No. 7B.

(Continued)

*Primary Examiner*—Melur Ramakrishnaiah
(74) *Attorney, Agent, or Firm*—TraskBritt

(57) ABSTRACT

A method, system and device for relay call transfer services in hearing-impaired communications is described. A voice phone number of a relay service is entered into a voice phone and a first segment of a communication session is established between a hearing-capable user on a voice phone and a relay service. The hearing-capable caller provides the relay service with a contact number of a hearing-impaired user. The relay service accesses the user profile of the hearing-impaired user and determines the user's preferred communication devices listed from most preferred to least preferred. An interpreter or communications assistant attempts to establish a connection to the hearing-impaired user's most preferred communication device. If the relay service fails to establish a connection with the most preferred communication device, the relay service can then transfer the call to a subsequent call service system that corresponds to the hearing-impaired user's next most preferred communication device.

19 Claims, 6 Drawing Sheets

U.S. PATENT DOCUMENTS

| | | |
|---|---|---|
| 6,349,001 B1 | 2/2002 | Spitzer |
| 6,353,503 B1 | 3/2002 | Spitzer et al. |
| 6,356,392 B1 | 3/2002 | Spitzer |
| 6,384,982 B1 | 5/2002 | Spitzer |
| 6,498,628 B2 | 12/2002 | Iwamura |
| 6,553,116 B1 | 4/2003 | Vander Meiden |
| 6,611,281 B2 | 8/2003 | Strubbe |
| 6,618,099 B1 | 9/2003 | Spitzer |
| 6,693,630 B1 | 2/2004 | Siskind |
| 6,724,354 B1 | 4/2004 | Spitzer et al. |
| 6,775,014 B2 | 8/2004 | Foote et al. |
| 7,016,479 B2 * | 3/2006 | Flathers et al. ............... 379/52 |
| 2002/0177112 A1 | 11/2002 | Heller |
| 2005/0073574 A1 | 4/2005 | Krisbergh et al. |
| 2005/0091311 A1 | 4/2005 | Lund et al. |
| 2005/0094777 A1 | 5/2005 | McClelland |
| 2006/0285652 A1 * | 12/2006 | McClelland et al. .......... 379/52 |

FOREIGN PATENT DOCUMENTS

| | | |
|---|---|---|
| EP | 1 764 990 A2 | 3/2007 |
| EP | 1 764 991 A1 | 3/2007 |
| EP | 1 770 481 A2 | 4/2007 |
| JP | 2004-343175 | 12/2004 |
| WO | WO 03/019495 A2 | 3/2003 |
| WO | WO 2005/039165 A2 | 4/2005 |

OTHER PUBLICATIONS

European Search Report for EP 06 07 6735 dated Mar. 14, 2007.
European Search Report for EP 06 07 6736 dated Jan. 4, 2007.
European Search Report for EP 06 07 6734 dated Dec. 11, 2006.

* cited by examiner

METHOD, SYSTEM AND DEVICE FOR RELAY CALL TRANSFER SERVICE

BACKGROUND OF THE INVENTION

1. Field of the Invention

The invention relates generally to relay call transfer services for hearing-impaired communications, and, more specifically to a method, system and device for building user profiles for deaf or hearing-impaired users and providing relay call transfer services for hearing-capable users.

2. State of the Art

Relay services are used to facilitate the communication between hearing-capable and hearing-impaired users. To interface a hearing-impaired user into a generally voice-based communication system, services are employed allowing hearing-impaired users to communicate with a relay service, namely through an interpreter or a communication assistant. A hearing-impaired user can effectively communicate with a hearing-capable user in a remote location through a relay service using various communication services and devices. Current relay services include VRS (Video Relay Services), VCO (Voice Carry Over), IP-Relay, CAPTel, and TTY.

Depending on the service that is provided, a different communication device is required on the part of both the hearing-impaired user and the interpreter or communication assistant of the relay service. For example, in a VRS call, the hearing-impaired user and the interpreter uses a video phone or web camera and the associated software to communicate back and forth using IP-based video. In an IP-Relay call, the hearing-impaired user and the communication assistant uses either some form of browser-based tool on two PCs connected over the Internet or a cellular-based hand held device used by the hearing-impaired user connected to a browser-based application used by the communication assistant.

Hearing-impaired users typically initiate calls to a hearing-capable user at a fairly high success rate. Conversely, because a hearing-impaired user does not always have immediate access to all of his or her personal communication devices, a call from a hearing-capable user to a hearing-impaired user is not always as successful. For example, when a hearing-capable user wishes to contact a hearing-impaired user via a video phone, the hearing-capable user initiates a communication session by entering, in a voice phone, the phone number of the VRS. The VRS then attempts to establish a connection with the hearing-impaired user via a video phone located in the hearing-impaired user's office or home. If the hearing-impaired user is not in his or her office or home, the call cannot be completed and the communication session cannot take place.

Therefore, in order to provide greater ease and efficiency for users of hearing-impaired communication services, a need exists for improving the call completion rate of a hearing-capable user to a hearing-impaired user.

BRIEF SUMMARY OF THE INVENTION

The present invention is directed to a method, system and device for relay call transfer services in a deaf or hearing-impaired communication system. In one embodiment of the present invention, a method for providing a communication session is provided. The method includes entering into a voice phone a called party number of a relay service and establishing a first segment of a communication session between the voice phone and the relay service. The method further includes retrieving a profile of a relay service user and establishing a second segment of the communication session between the relay service and a communication device.

In another embodiment of the present invention, a relay service communication system is provided. The system includes at least one communication device and a relay service device configured to receive a voice phone call and establish a first segment of a communication session. The relay service device is further configured to store at least one user profile. The system also includes at least one communication link for transmitting signals of the at least one communication device and relay service device. In addition, the system includes at least one call service system associated with the at least one communication device.

In a further embodiment of the present invention, a relay service device is provided. The device includes control logic configured to establish a first segment of a communication session with a voice phone. The control logic is further configured to establish a second segment of the communication session with a communication device. The device also includes storage configured to store a profile corresponding to a relay service user.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
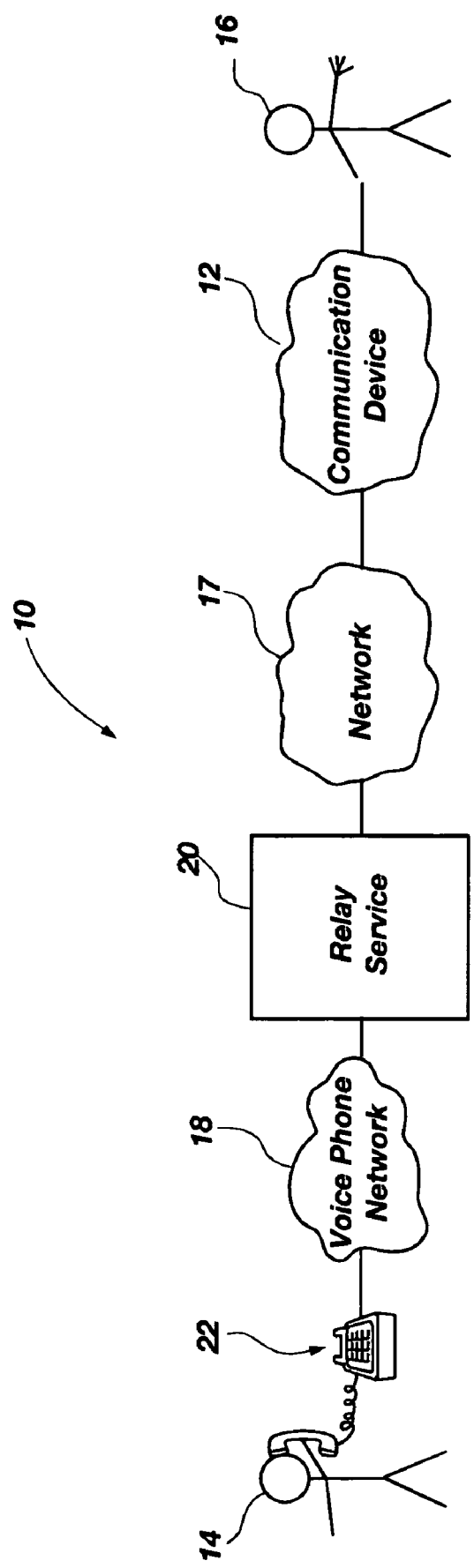
FIG. 1 illustrates a hearing-impaired communication system, in accordance with an embodiment of the present invention.

Relay services provide assistance in a communication session between a hearing-capable user and a hearing-impaired user. One application of a relay service is to assist a hearing-capable caller in an attempt to contact and communicate with a hearing-impaired individual. Relay services typically provide a variety of services in several areas for hearing-impaired communications. These services can include, but are not limited to, video relay services (VRS), voice carry over (VCO), IP-Relay, CAPTel, and TTY. Based on the service that is used, a corresponding electronic communication device is required on the part of both the hearing-impaired user and the relay service interpreter or communications assistant. Many electronic devices for relaying communicative expressions of both hearing-capable and hearing-impaired users currently exist. These devices can include, but are not limited to, video phones, web cameras, hand-held text messaging devices, and IP-based CAPTel phones. The communicative expressions, such as sign language and/or text messaging, may be interpreted or relayed by a translation or interpretive service, such as a relay service, while a hearing-capable user may interact in a conventional manner with the relay service through the use of a voice-based dialogue conveyed either over a conventional voice phone or another communication device.

Currently, a need exists to improve the ability of a hearing-capable user to contact and communicate with a hearing-impaired user. Often, a hearing-capable caller attempts to contact a hearing-impaired individual via a single communication device, and, at the time, the hearing-impaired individual does not have immediate access to the device. Consequently, the call fails and the desired communication does not take place. In many cases, unbeknownst to the hearing-capable caller, a hearing-impaired individual has alternate communication devices on which he or she could be reached. Thus, there is a desire to take advantage of the alternate communication devices used by a hearing-impaired individual to improve the successful call connection rate.

In one embodiment of the present invention, a hearing-capable user initiates a communication session by entering, in a voice phone, the phone number of a relay service which the caller selected to provide assistance in the communication. The call is then received by the relay service and the caller provides the relay service with the contact number of the hearing-impaired individual with whom the caller wishes to speak. The contact number is used to identify and access a user profile for the hearing-impaired individual stored on the relay service server. Included in the user profile, among other data, would be a list of the user's preferred communication devices ordered from most to least preferred. The relay service then transfers the call request to the appropriate service system corresponding to the most preferred communication device listed in the hearing-impaired user's profile. An interpreter or communications assistant then attempts to establish a connection to the hearing-impaired user via the appropriate communication device. If the call is answered, the communication session proceeds to take place with the assistance of the interpreter or communications assistant. Alternatively, if the hearing-impaired user does not answer the call, the service system automatically transfers the hearing-capable caller, and all the associated data pertaining to the call, to the service system that handles calls according to the hearing-impaired user's next most preferred communication device. This process can continue until the hearing-impaired user ultimately answers the call or until attempts have been made to contact all of the preferred communication devices defined in the hearing-impaired user's profile.

FIG. 1 illustrates a hearing-impaired communication system configured to facilitate a communication session between a hearing-impaired user and a hearing-capable user, in accordance with an embodiment of the present invention. A hearing-impaired communication system 10 enables a hearing-capable user 14 to engage in conversation through a communication session with a hearing-impaired user 16. A communication session between the users is facilitated through the use of various equipments, which are preferably coupled together using various networks, including a voice phone network, such as the Public Switch Telephone Network (PSTN).

To interface a hearing-impaired user into a generally voice-based communication system, relay services are employed allowing a hearing-impaired user to communicate with an interpreter or a communication assistant. A hearing-impaired user may successfully communicate with a hearing-capable user in a remote location through a relay service using a variety of communication services and devices. Current relay services include, but not limited to, VRS (Video Relay Services), VCO (Voice Carry Over), IP-Relay, CAPTel, and TTY. Hearing-capable user 14 interacts in a conventional manner with relay service 20 through the use of a voice-based dialogue conveyed over a conventional voice phone 22.

The various devices, such as a communication device 12 and conventional voice phone 22, are coupled with a relay service 20 using one or more networks 17, 18. To facilitate the enhanced bandwidth needs of a video phone or web camera, network 17 may be implemented as a high bandwidth network such as a DSL, Cable, Ethernet or other enhanced-bandwidth networking technology. Network 18 may be implemented according to the standards and bandwidth requirements of conventional voice phone 22.

In one embodiment of the present invention, a hearing-capable user 14 initiates a voice phone call to the relay service 20. The call is received by the relay service 20 and the hearing-capable user 14 provides the relay service 20 with the contact number of the hearing-impaired user 16 with whom the caller wishes to speak. The relay service 20 then attempts to establish a connection with the hearing-impaired user 16 via a communication device 12 that may include, but is not limited to, a video phone, a web camera, a text messaging device, or an IP-based CAPTel phone. The communication devices are required on the part of both the hearing-impaired user and the video relay service interpreter or communication assistant. Based on the communication device that is used, an appropriate service is required. These services may include, but are not limited to, Video Relay Services (VRS), Voice Carry Over (VCO), IP-Relay, CAPTel, and TTY.

Figure 2:
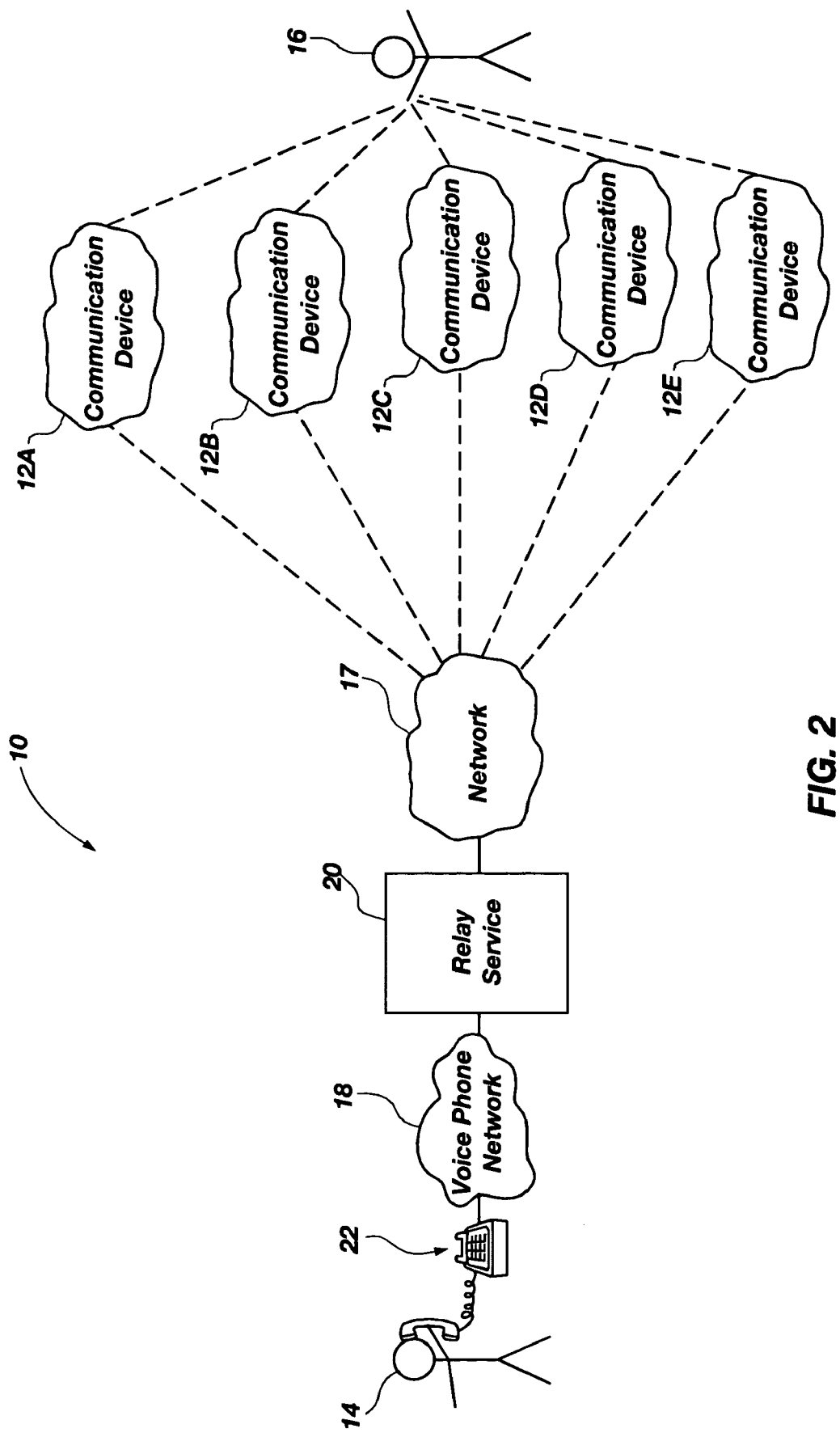
FIG. 2 illustrates a hearing-impaired communication system, in accordance with an embodiment of the present invention.

FIG. 2 is a simplified diagram of a hearing-impaired communication system 10, in accordance with an embodiment of the present invention. Hearing-capable user 14, using voice phone 22 over network 18, initiates a voice phone call to a relay service 20. The call is taken by the relay service 20 and the hearing-capable user 14 provides the relay service 20 with the contact number of the hearing-impaired user 16 with whom the caller wishes to speak. The relay service 20 will then attempt to establish a connection over network 17 with the hearing-impaired user 16 via the communication device 12. In one embodiment, hearing-impaired user 16 may have multiple communication devices 12A, 12B, 12C, 12D, 12E, thus allowing the hearing-impaired user 16 to interact in a communication session using various services corresponding to the various communication devices.

Figure 3:
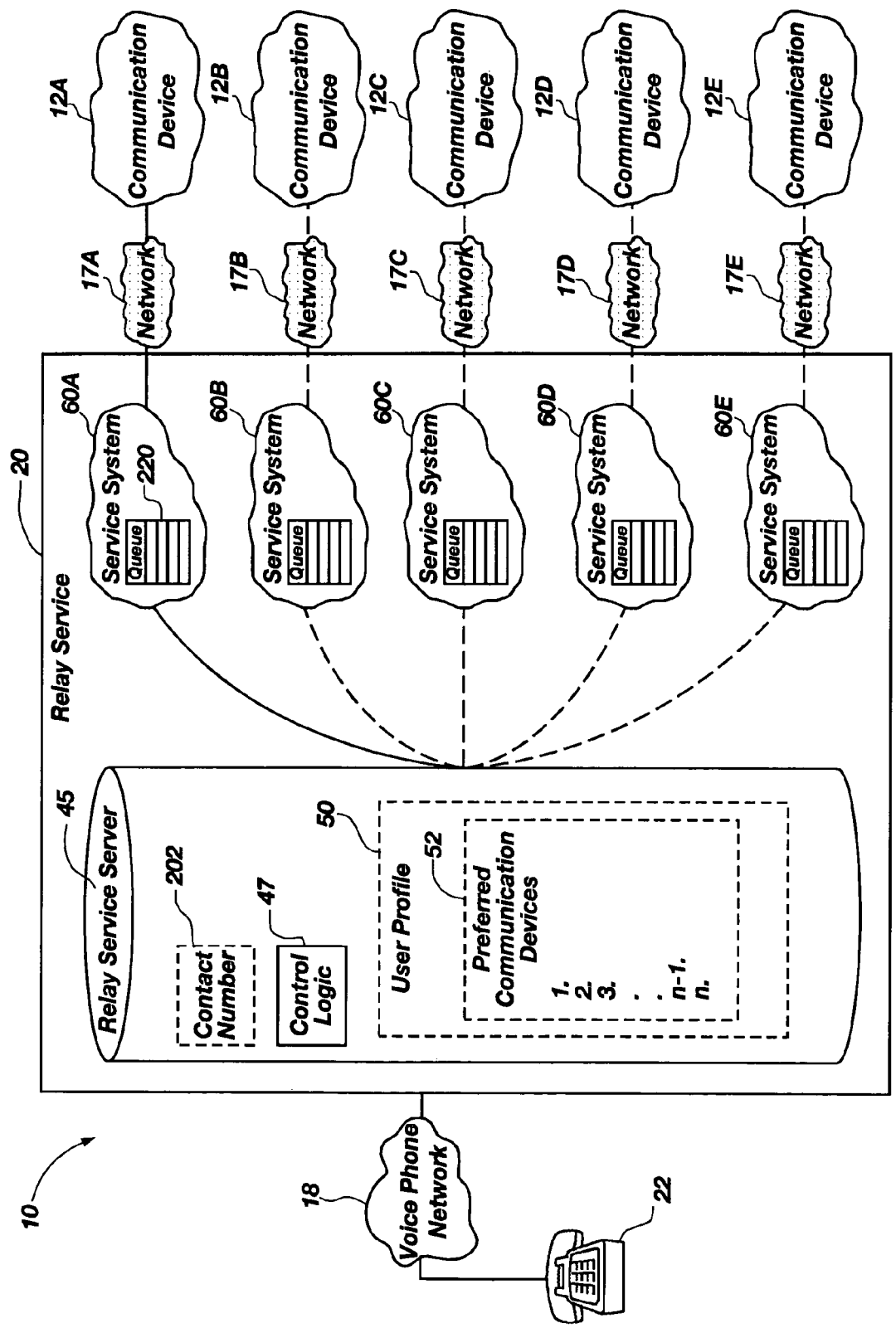
FIG. 3 illustrates a hearing-impaired communication system, in accordance with an embodiment of the present invention.

FIG. 3 is a functional block diagram of a hearing-impaired communication system 10 including a relay service server, configured in accordance with an embodiment of the present invention. The voice phone 22 and the communication devices 12A-12E interact via relay service 20 and as further coupled via network 17 (individual networks 17A, 17B, 17C, 17D, and 17E), 18. A hearing-capable user enters, into a voice phone 22, a voice phone number of a relay service 20. Upon completion of the call, a hearing-capable user provides the relay service with a contact number 202 of a hearing-impaired individual with whom the caller wishes to speak. The contact number 202 is stored in the relay service server 45, and is used by control logic 47 to access a user profile 50 that corresponds to the contact number 202. User profile 50 contains, among other things, a list of the user's preferred communication devices 52. The preferred communication devices 52 will be listed in the order of most preferred device to least preferred device. For example, and not by way of limitation, a hearing-impaired user may have a video phone or web camera as his or her most preferred device at his or her home or office. The user may also carry a hand-held text messaging device as his or her second most preferred device, and may also have an IP-based CAPTel phone located in his or her home as his or her third most preferred device.

After successfully accessing the user profile 50, and determining the user's preferred communication device 52, the relay service 20 routes the call to an appropriate call service system 60A, 60B, 60C, 60D, 60E, and, in turn attempts to establish a connection to the user's preferred communication device 12. If the relay service 20 fails to establish a connection with the most preferred communication device, the relay service 20 can transfer the call to a second call service system that corresponds to the hearing-impaired user's second most preferred communication device. This process can continue until the relay service 20 has attempted to establish a connection with all of the defined preferred communication devices 52 listed for the hearing-impaired user.

For example, and not by way of limitation, when the relay service 20 looks up a hearing-impaired user's profile 50 and determines that the user's preferred communication device is a video phone, the relay service creates a call in the database and the call request is put in the appropriate call queue 220 viewable to the video phone call service system 60. A video relay service (VRS) interpreter then takes the call out of the call queue 220, and, in doing so, automatically transfers the phone call to the interpreter, thus connecting the hearing-capable caller and the interpreter. The relay service 20 subsequently attempts to contact the hearing-impaired user on his or her video phone communication device 12. If the hearing-impaired user does not answer the VRS interpreter, the interpreter asks the hearing-capable caller if he or she would like the relay service to attempt to contact the hearing-impaired user on his or her next most preferred communication device (such as, in this case, a hand-held paging device). If the caller wishes to try the alternate device, the VRS interpreter then transfers the call request, and all of the associated data, to the call service system 60 that handles the IP-Relay calls. The call is then placed in the appropriate call queue 220 servicing IP-Relay calls. An IP-Relay communications assistant then takes the call out of the call queue 220, and, in doing so, automatically transfers the phone call to the communications assistant. The communications assistant then attempts to contact the hearing-impaired user on his or her hand-held paging device. This process can continue until the hearing-impaired user answers the called communication device, or until the relay service 20 has attempted to establish a connection with all of the defined preferred communication devices 52 for the hearing-impaired user.

Figure 4:
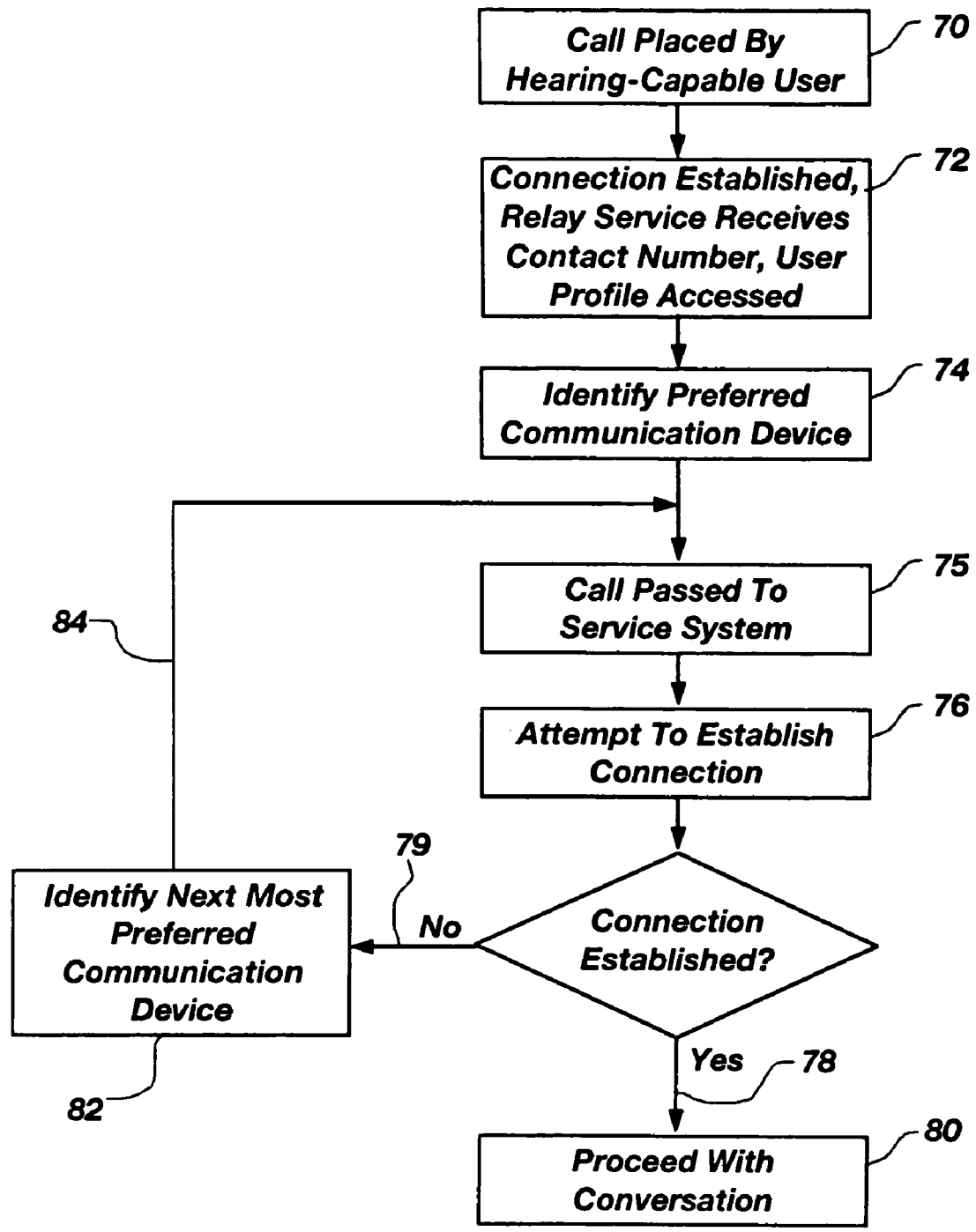
FIG. 4 is a simplified flow diagram of a communication session, in accordance with an embodiment of the present invention.

FIG. 4 is a flow diagram illustrating the establishment of a hearing-impaired communication session configured in accordance with an embodiment of the present invention. In the present embodiment, a hearing-impaired communication is initiated 70 by a hearing-capable user by entering the voice phone number of a relay service into a voice phone. Upon establishing a connection with a relay service, the hearing-capable user provides the relay service with the contact number 72 of a hearing-impaired individual with whom he or she wishes to speak. Using the contact number 72 provided, the relay service accesses the user profile that includes the hearing-impaired user's preferred communication devices. The relay service then identifies the preferred communication method 74 of the hearing-impaired user and passes the call 75 to the appropriate service system that handles calls relating to the hearing-impaired user's identified communication device. The service system then, in turn, attempts to establish a connection to the hearing-impaired party via the preferred method 76. If the relay service is successful 78 in establishing a connection, the interpreter or communications assistant proceeds to provide assistance in carrying out the conversation between the hearing-capable user and the hearing-impaired user 80. If the relay service fails 79 to establish a connection, the relay service identifies the next most preferred communication device according to the hearing-impaired user's list of preferred communication devices and attempts to establish a connection 82. It is intended that this connection establishment process 84 continue until the hearing-impaired user answers the called communication device or until the relay service has attempted to establish a connection with all of the defined preferred communication devices for the hearing-impaired user.

Figure 5:
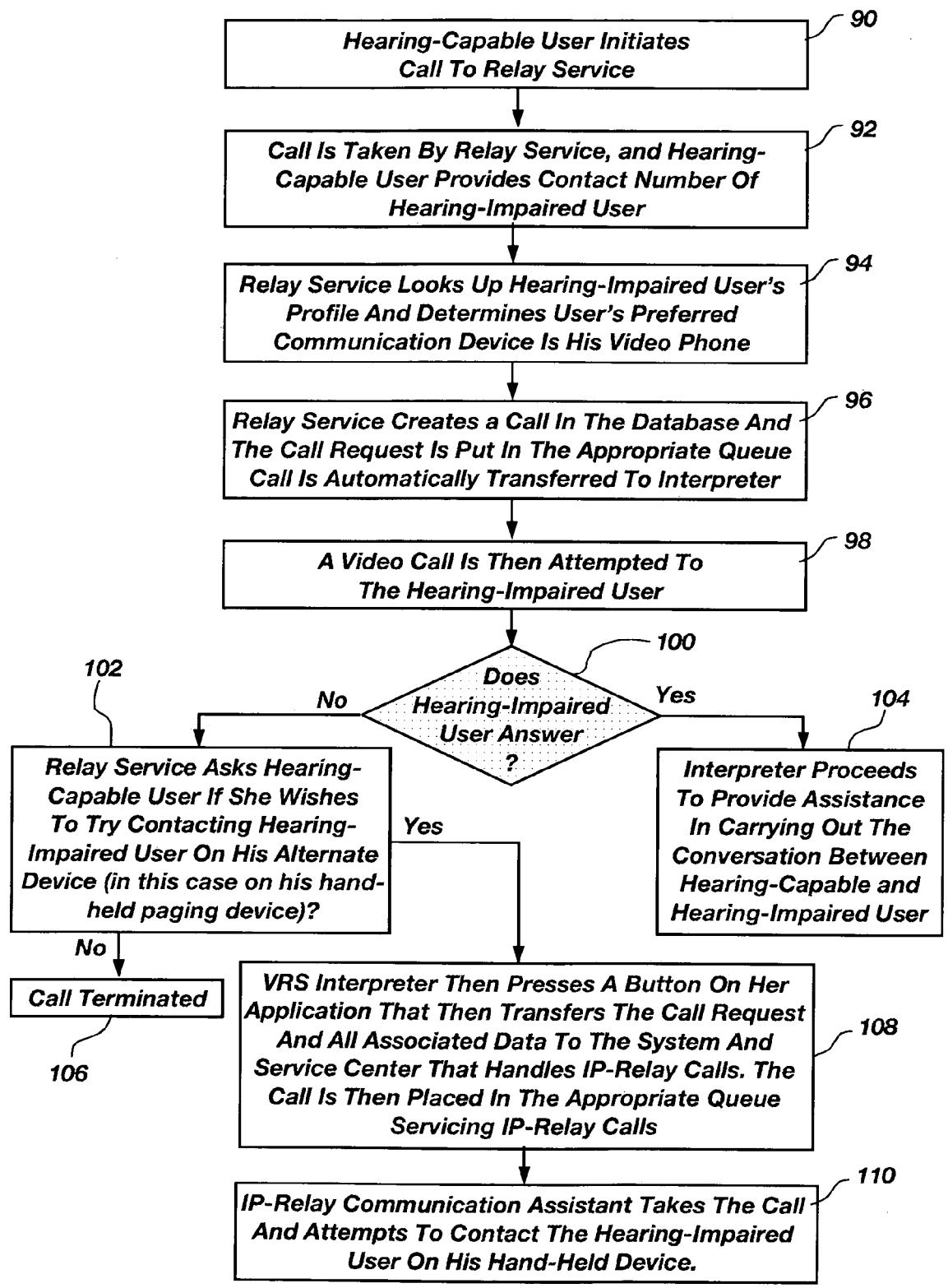
FIG. 5 is a detailed flow diagram of a communication session, in accordance with an embodiment of the present invention.

FIG. 5 is a detailed flow diagram illustrating the establishment of a hearing-impaired communication session configured in accordance with an embodiment of the present invention. In the present embodiment, a hearing-capable user initiates a communication session by entering, into a voice phone, the voice phone number of a relay service 90. The call is received by the relay service and the hearing-capable caller provides the relay service with the contact number 92 of a hearing-impaired user with whom he or she wishes to speak. Using the contact number provided, the relay service looks up the profile for the hearing-impaired user and determines the preferred communication devices in order from most preferred to least preferred. In this case, by way of example, and not by way of limitation, the relay service determines the hearing-impaired user's preferred communication device is a video phone 94. The relay services then creates a call in the database and the call request is put in the appropriate queue viewable to the VRS call centers. Upon a VRS interpreter retrieving the call from the queue, the call is automatically transferred 96, and the relay service attempts to contact to the hearing-impaired user on his or her video phone 98. If the hearing-impaired user answers 100 the call on his or her video phone, a call is facilitated. The interpreter then proceeds to provide assistance in carrying out the conversation between the hearing-capable user and the hearing-impaired user 104.

Conversely, if the hearing-impaired user does not answer 100 the video phone call, the relay service asks the hearing-capable user if he or she wishes to try contacting the hearing-impaired user on his or her alternate device (in this case, on his or her hand-held paging device) 102. If the caller does not wish to proceed, the call is terminated 106. If the caller wishes to proceed, the VRS interpreter transfers the call request, and all associated data, to the call service system that handles IP-Relay calls. The call is then placed in the appropriate queue servicing IP-Relay calls 108 and an IP-Relay communications assistant takes the call and attempts to contact the hearing-impaired user on his or her hand-held device 110. This process can continue until the hearing-impaired user answers the called communication device or until the relay service has attempted to establish a connection with all of the defined preferred communication devices for the hearing-impaired user.

Figure 6:
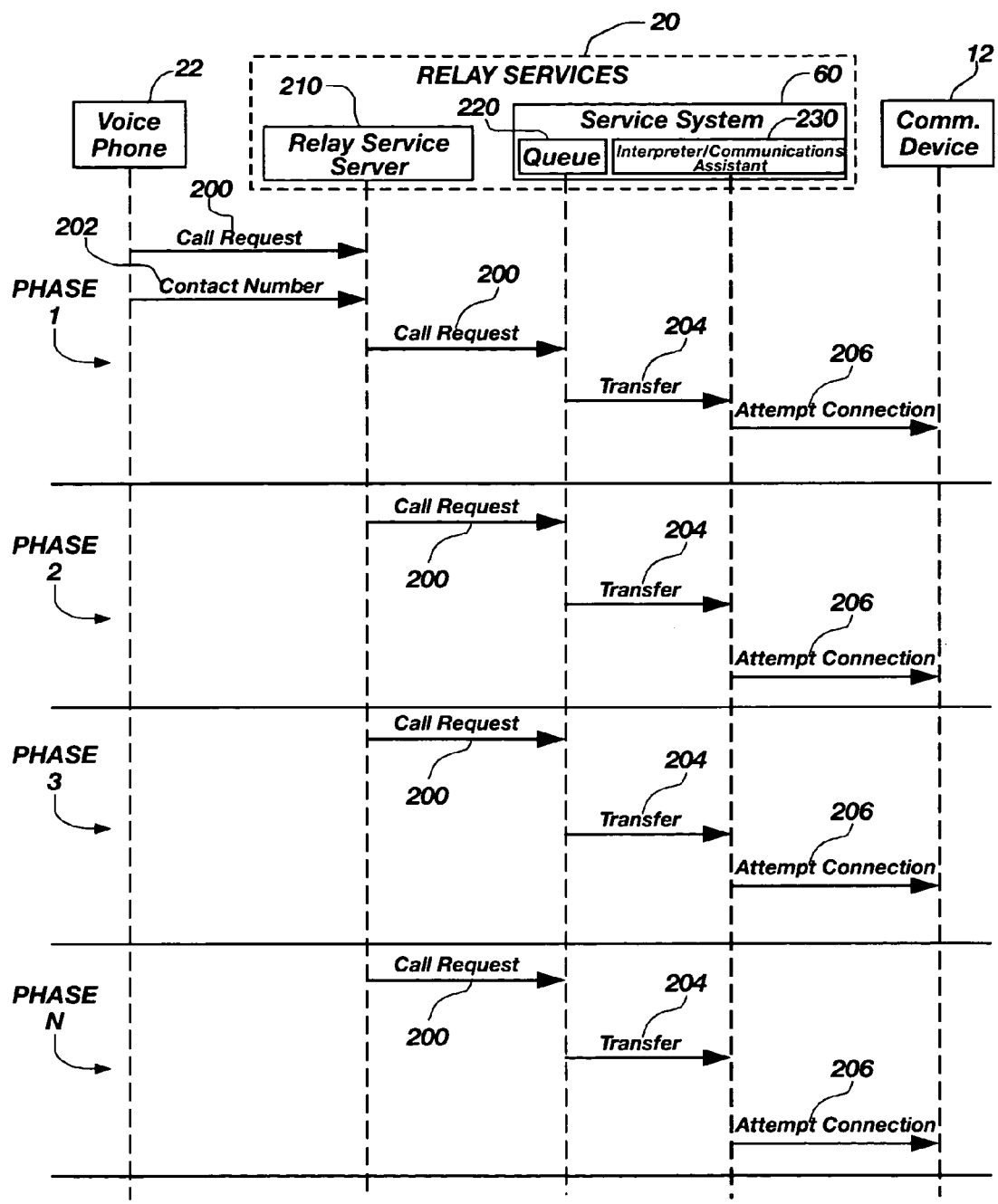
FIG. 6 is a flow diagram of a communication session, in accordance with an embodiment of the present invention.

FIG. 6 is a flow diagram illustrating the establishment of a hearing-impaired communication session configured in accordance with an embodiment of the present invention. First referring to phase 1, in the present embodiment, a hearing-capable individual, using a voice phone 22, initiates a call request 200 by entering the phone number of a relay service 20. Upon establishing a communication session with the relay service server 210, the hearing-capable caller provides a contact number 202 of the hearing-impaired individual with whom the caller wishes to speak. The relay service server 210, using the contact number provided, accesses the corresponding profile for the hearing-impaired user and identifies the most preferred communication device. The server 210 then places the call request 200 into the appropriate call queue 220 located in the service system 60 that handles calls relating to the hearing-impaired user's most preferred communication device. When an interpreter or communications assistant is ready to receive the call request, the call is transferred 204 and the hearing-capable user is connected to the interpreter or communications assistant 230. The service system 60 then attempts to connect 206 with the hearing-impaired user on the specified communication device 12. If the hearing-impaired user answers the call, then the communication session takes place.

Alternatively, if the call is not answered, the interpreter or communications assistant 230 asks the hearing-capable user if he or she wishes to try contacting the hearing-impaired user on his or her alternate device. If the hearing-capable caller wishes to proceed as illustrated by phase 2, the call request 200 is forwarded to the appropriate queue 220 located in the service system 60 that handles calls relating to the hearing-impaired user's second most preferred communication device. When an interpreter or communications assistant 230 is ready to receive the call request, the call is transferred 204 and the hearing-capable user is connected to the interpreter or communications assistant 230. The service system 60 then attempts to connect 206 with the hearing-impaired user on the specified communication device 12. If the hearing-impaired user answers the call, the communication session is established.

Otherwise, if the hearing-impaired user does not answer the call, the relay service 20 can continue attempting to reach 206 the hearing-impaired user according to a third most preferred communication device 12 as illustrated by phase 3. Ultimately this process can continue until the relay service 20 has attempted to establish a connection with the hearing-impaired user on his or her nth most preferred communication device 12 as illustrated by phase n.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method for providing a communication session comprising:
    entering in a voice phone a called party number of a relay service;
    establishing a first segment of a communication session between the voice phone and the relay service;
    retrieving a profile of a relay service user, the profile comprising a list of a plurality of communication devices associated with the relay service user;
    entering a call request into a call queue associated with a communication device, the call queue selected from a plurality of call queues, wherein each call queue of the plurality of call queues is associated with one communication device of the plurality of communication devices; and
    attempting to establish a second segment of the communication session between the relay service and the communication device.

2. The method of claim 1, wherein the list of the plurality of communication devices comprises a list of communication devices in order from most preferred to least preferred.

3. The method of claim 1, wherein attempting to establish a second segment further comprises providing the relay service with a contact number of a relay service user.

4. The method of claim 3, wherein attempting to establish a second segment further comprises routing a call to a specific service system corresponding to the user's most preferred communication device.

5. The method of claim 4, wherein attempting to establish a second segment further comprises attempting to establish a connection with the user's most preferred communication device.

6. The method of claim 1, wherein attempting to establish a second segment further comprises transferring a call to a specific service system corresponding to the user's next most preferred communication device.

7. The method of claim 6, wherein attempting to establish a second segment further comprises attempting to establish a connection with the user's next most preferred communication device.

8. A relay service communication system comprising:
    a relay service device configured to receive a voice phone call and establish a first segment of a communication session, the relay service system further configured to store at least one user profile;
    a plurality of communication devices;
    at least one communication link for transmitting signals of the plurality of communication devices and the relay service device; and
    a plurality of call service systems including a call queue, wherein each call service system of the plurality of call service systems is associated with one communication device of the plurality of communication devices.

9. The system of claim 8, wherein the at least one user profile comprises a list of at least one communication device associated with a user.

10. The system of claim 9, wherein the list of at least one communication device further comprises a list of communication devices in order from most preferred to least preferred.

11. The system of claim 8, wherein the relay service device is further configured to establish a second segment of the communication session.

12. The system of claim 8, wherein the at least one communication device is selected from a group consisting of a video phone, a web camera, a text messaging device, and a CAPTel phone.

13. A relay service device comprising:
    control logic configured to establish a first segment of a communication session with a voice phone, the control logic further configured to attempt to establish a second segment of the communication session with a communication device;
    a plurality of call service systems including a call queue, wherein each call service system of the plurality of call service systems is associated with one communication device of a plurality of communication devices; and
    storage configured to store a profile corresponding to a relay service user.

14. The device of claim 13, wherein the control logic is further configured to retrieve a profile corresponding to a contact number of a user.

15. The device of claim 13, wherein the control logic is further configured to route a call to a specific service system.

16. The device of claim 13, wherein the profile comprises a list of at least one communication device associated with the user.

17. The device of claim 13, wherein the list of at least one communication device further comprises a list of communication devices in order from most preferred to least preferred.

18. The device of claim 13, wherein the control logic is further configured to establish a connection with the user's most preferred communication device.

19. The device of claim 13, wherein the control logic is further configured to attempt to establish a connection with the user's next most preferred communication device.

* * * * *

UNITED STATES PATENT AND TRADEMARK OFFICE
CERTIFICATE OF CORRECTION

| | | |
|---|---|---|
| PATENT NO. | : 7,746,985 B2 | Page 1 of 1 |
| APPLICATION NO. | : 11/225956 | |
| DATED | : June 29, 2010 | |
| INVENTOR(S) | : Edward Franz Armstrong et al. | |

It is certified that error appears in the above-identified patent and that said Letters Patent is hereby corrected as shown below:

In the specification:

| | |
|---|---|
| COLUMN 1, LINE 29, | change "uses a video" to --use a video-- |
| COLUMN 1, LINE 32, | change "assistant uses" to --assistant use-- |
| COLUMN 3, LINE 65, | change "but not" to --but are not-- |
| COLUMN 4, LINE 49, | change "network 17" to --networks 17-- |

In the claims:

| | |
|---|---|
| CLAIM 12, COLUMN 8, LINE 42, | change "wherein the at" to --wherein at-- |
| CLAIM 12, COLUMN 8, LINE 43, | change "a group" to --the group-- |
| CLAIM 17, COLUMN 9, LINE 1, | change "claim 13," to --claim 16,-- |

Signed and Sealed this

Twenty-ninth Day of November, 2011

David J. Kappos
*Director of the United States Patent and Trademark Office*